(12) United States Patent
Chen et al.

(10) Patent No.: US 12,204,351 B2
(45) Date of Patent: Jan. 21, 2025

(54) METHOD AND APPARATUS FOR DOCKING SELF-MOVING DEVICE TO CHARGING STATION, AND SELF-MOVING DEVICE AND READABLE STORAGE MEDIUM

(71) Applicant: Suzhou Cleva Precision Machinery and Technology Co., Ltd., Suzhou (CN)

(72) Inventors: Hong Chen, Suzhou (CN); Shaoming Zhu, Suzhou (CN); Xue Ren, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 0 days.

(21) Appl. No.: 17/769,028

(22) PCT Filed: Sep. 24, 2020

(86) PCT No.: PCT/CN2020/117445
§ 371 (c)(1),
(2) Date: Apr. 14, 2022

(87) PCT Pub. No.: WO2021/227335
PCT Pub. Date: Nov. 18, 2021

(65) Prior Publication Data
US 2024/0103546 A1    Mar. 28, 2024

(30) Foreign Application Priority Data
May 9, 2020 (CN) .......................... 202010387092.9

(51) Int. Cl.
*G05D 1/661* (2024.01)
*A01D 34/00* (2006.01)
(Continued)

(52) U.S. Cl.
CPC .......... *G05D 1/661* (2024.01); *A01D 34/008* (2013.01); *G05D 1/244* (2024.01);
(Continued)

(58) Field of Classification Search
None
See application file for complete search history.

(56) References Cited

U.S. PATENT DOCUMENTS 9,144,360 B2 * 9/2015 Ozick .................. A47L 9/0488
11,372,420 B2 6/2022 Strandberg et al.
(Continued)

FOREIGN PATENT DOCUMENTS

CN    108345297 A    7/2018
CN    108664014 A    10/2018
(Continued)

OTHER PUBLICATIONS

International Search Report for Application No. PCT/CN2020/117445, dated Feb. 3, 2021.

*Primary Examiner* — Amelia Vorce
(74) *Attorney, Agent, or Firm* — JK Intellectual Property Law, PA

(57) ABSTRACT

A method for docking a self-moving device to a charging station includes controlling the self-moving device to move relative to a docking boundary using a radio detection device, the radio detection device including a positioning base station and a positioning tag. The method includes judging whether the self-moving device senses a signal from a boundary line, and then taking certain steps depending on whether the boundary line signal was sensed. Related docking devices, self-moving devices, and storage media are also disclosed.

5 Claims, 6 Drawing Sheets

(51) Int. Cl.
*G05D 1/244* (2024.01)
*A01D 101/00* (2006.01)
*G05D 111/10* (2024.01)
*G05D 111/30* (2024.01)

(52) U.S. Cl.
CPC ...... *A01D 2101/00* (2013.01); *G05D 2111/10* (2024.01); *G05D 2111/36* (2024.01)

(56) References Cited

U.S. PATENT DOCUMENTS

| | | | |
|---|---|---|---|
| 11,457,558 B1* | 10/2022 | Phanco | G06F 18/243 |
| 2017/0102709 A1* | 4/2017 | Kwak | A47L 9/2847 |
| 2018/0081366 A1* | 3/2018 | Tan | G05D 1/0265 |
| 2019/0041869 A1* | 2/2019 | Shao | G05D 1/0257 |
| 2022/0274655 A1* | 9/2022 | Ma | A47L 9/009 |
| 2023/0084940 A1* | 3/2023 | Dalfra | B25J 13/087 |
| | | | 700/258 |

FOREIGN PATENT DOCUMENTS

| | | | | |
|---|---|---|---|---|
| CN | 109038724 | A | 12/2018 | |
| CN | 109690436 | A | 4/2019 | |
| CN | 210202476 | U | 3/2020 | |
| CN | 210442682 | U | 5/2020 | |
| DE | 102008009208 | A1 * | 8/2009 | ........... A01D 34/008 |

\* cited by examiner

METHOD AND APPARATUS FOR DOCKING SELF-MOVING DEVICE TO CHARGING STATION, AND SELF-MOVING DEVICE AND READABLE STORAGE MEDIUM

CROSS-REFERENCE TO RELATED PATENT APPLICATIONS

This application is a national stage of International Application No. PCT/CN2020/117445, filed on Sep. 24, 2020, which claims priority to CN patent application No. 202010387092.9, filed on May 9, 2020. All of the aforementioned applications are hereby incorporated by reference in their entireties.

TECHNICAL FIELD

The present disclosure relates to a method and device for docking a self-moving device with a charging station, a self-moving device and a readable storage medium, and in particular to a method and device for docking a self-moving device with a charging station, a self-moving device and a readable storage medium with improved regression efficiency.

BACKGROUND

With the development of science and technology, the application of outdoor robots is becoming more and more extensive. For example, intelligent lawn mowers can automatically help people maintain the lawn, freeing people from the boring and time-consuming housework of lawn maintenance, so it is very popular. In the process of performing functional tasks, the outdoor robot does not need the user's operation, which requires the outdoor robot to have a good positioning function so that it can move automatically in the working region.

In order to achieve the accurate arrival of the intelligent lawn mower to the charging station, the traditional method is to lay out a boundary line around the grass, and the boundary line can be a magnetic guideline that emits electromagnetic signals to the outside, the electromagnetic signal sensor of the intelligent lawn mower makes the boundary line longitudinally at the center of the intelligent lawn mower through the induced electromagnetic signal strength, so that the intelligent lawn mower moves to the charging station along the laid boundary line. In this method, the intelligent lawn mower searches for the boundary line according to random directions, and it takes a long time to find the boundary line, which is not conducive to improving the regression efficiency.

SUMMARY

The present disclosure provides a method and device for docking a self-moving device with a charging station, a self-moving device and a readable storage medium, which can improve the regression efficiency.

The present disclosure provides a method for docking a self-moving device with a charging station, wherein the charging station is connected to a boundary line, and the method comprises the following steps:
controlling the self-moving device to move from the current position close to a docking boundary;
judging whether the self-moving device senses the boundary line signal during the moving process;
if the self-moving device senses the boundary line signal before it reaches the docking boundary or when it reaches the docking boundary, controlling the self-moving device to move to the charging station through the boundary line signal until the docking is successful;
if the self-moving device does not sense the boundary line signal when it reaches the docking boundary, controlling the self-moving device to move from the docking boundary to the boundary line until the boundary line signal is sensed.

Optionally, the controlling the self-moving device to move from the docking boundary to the boundary line until the boundary line signal is sensed, comprising:
controlling the self-moving device to move around the docking boundary along the docking boundary until a boundary line signal is sensed.

Optionally, the controlling the self-moving device to move from the docking boundary to the boundary line until the boundary line signal is sensed, comprising:
controlling the self-moving device to rotate at a predetermined angle on the docking boundary and continue to walk until a boundary line signal is sensed.

Optionally, the controlling the self-moving device to move from the current position close to the docking boundary comprises:
controlling the self-moving device to move from the current position close to the docking boundary through the radio detection device, the radio detection device comprising a positioning base station and a positioning tag, the positioning base station set within a predetermined distance of the charging station, and the positioning tag set on the self-moving device, according to the distance between the positioning tag and the positioning base station, controlling the self-moving device to move from the current position close to the docking boundary.

Optionally, the docking boundary is a docking circle with the positioning base station as the center, the radius of the docking circle is $D_{dst}$, and the distance between at least part of the boundary line and the positioning base station is not less than $D_{dst}$.

Optionally, the controlling the self-moving device to move from the current position close to the docking boundary comprises:
controlling the self-moving device to move forward from the current position along the current direction, and judging whether the self-moving device senses the boundary line signal, and when the self-moving device does not sense the boundary line signal, judging whether the self-moving device reaches the docking boundary;
wherein,
if the self-moving device does not reach the docking boundary, judging whether the distance between the self-moving device and the positioning base station is decreasing, wherein, if the distance between the self-moving device and the positioning base station is decreasing, controlling the self-moving device to move from the current position along the current direction, and judging whether the self-moving device senses the boundary line signal; if the distance between the self-moving device and the positioning base station is not decreasing, controlling the self-moving device to rotate along the first rotating direction by a first predetermined rotation angle, and then controlling the self-moving device to move forward from the current position along the current direction, and judging whether the self-moving device senses the boundary line signal;

if the self-moving device has reached the docking boundary, controlling the self-moving device to move from the docking boundary to the boundary line until the boundary line signal is sensed.

Optionally, the controlling the self-moving device to move from the current position close to the docking boundary comprises:

controlling the self-moving device to move from the current position to the docking boundary through a vision system, the vision system comprising a camera set on the self-moving device and a docking mark set on the charging station.

The present disclosure also provides a docking device between a self-moving device and a charging station, the device comprising:

a boundary line finding module, used to control the self-moving device to move from the current position close to the docking boundary; and to judge whether the self-moving device senses the boundary line signal;

a docking control module, used to control the self-moving device to move from the docking boundary to the boundary line until the boundary line signal is sensed; and to control the self-moving device to move to the charging station through the boundary line signal until the docking is successful.

The present disclosure also provides a self-moving device comprising a memory and a processor, the memory storing a computer program, and when the computer program is executed by the processor, the steps of a method for docking the self-moving device with a charging station are implemented.

The present disclosure also provides a readable storage medium storing a computer program thereon, and when the computer program is executed by a processor, the steps of the method for docking a self-moving device with a charging station are implemented.

Compared with the prior art, the present disclosure sets the docking boundary and controls the self-moving device to move close to the docking boundary to find the boundary line, which can reduce the time for the self-moving device to find the boundary line, thereby improving the regression efficiency of the self-moving device.

DETAILED DESCRIPTION

In order to make those skilled in the art better understand the technical solutions of the present disclosure, the technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments of the present disclosure, all other embodiments obtained by persons of ordinary skill in the art without creative efforts shall fall within the protection scope of the present disclosure.

Referring to FIGS. 1-7, the self-moving device 1 may be an automatic lawn mower, or an automatic vacuum cleaner, etc., which automatically walks in the working region to perform work such as mowing or vacuuming. The self-moving device 1 is powered by a power supply module (not shown). In order to ensure the normal power supply of the power supply module, the self-moving device 1 can be intelligently controlled to return to the charging station 2 according to the remaining power or working time of the power supply module for recharging, or return to the charging station 2 through the trigger button (not shown) on the self-moving device 1 for recharging as required, or send a recharge signal to the self-moving device 1 on the mobile terminal (not shown) to enable the self-moving device 1 return to charging station 2 for recharging.

A boundary line 21 is set in the region close to the charging station 2, and the region covered by the boundary line 21 is smaller than the working region. The self-moving device 1 can be guided to work in the working region through a radio detection device or a vision system, and the self-moving device 1 can also be guided by a radio detection device or a vision system to perform rough positioning and regression from regions beyond the boundary line 21, so as to make the self-moving device 1 close the charging station 2 and reach the region covered by the boundary line 21, and then, the self-moving device 1 is used to induce the electromagnetic signal sent from the boundary line 21 to guide the self-moving device 1 to perform precise positioning regression, so that the self-moving device 1 is docked with the charging station 2. Wherein, the radio detection device may be a positioning system such as UWB, Zigbee, and GPS.

Figure 1:
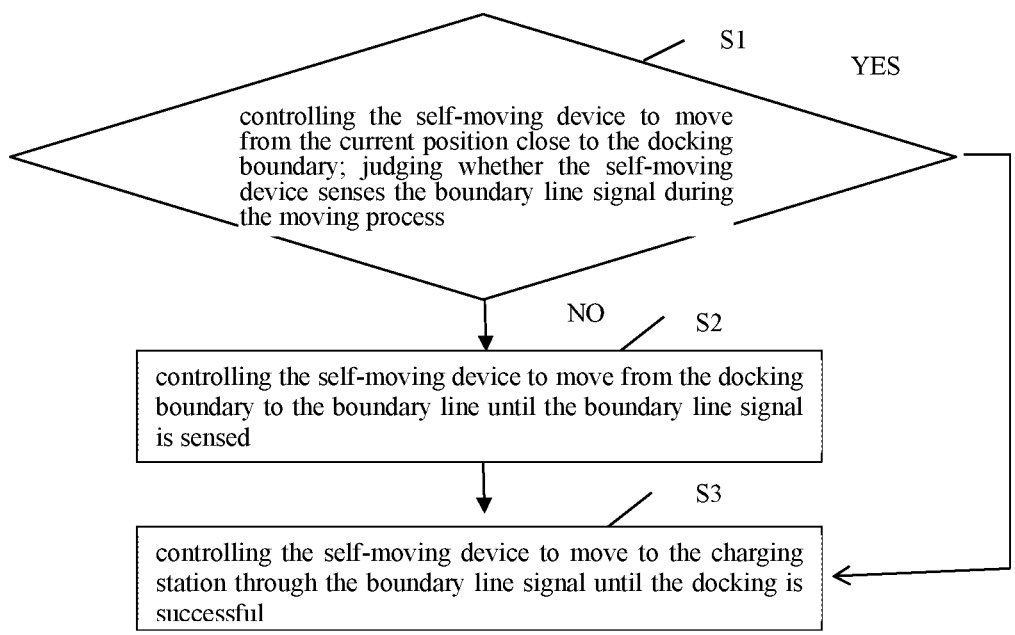
FIG. 1 is a flowchart of a first embodiment of a method for docking a self-moving device with a charging station according to the present disclosure.
Figure 2:
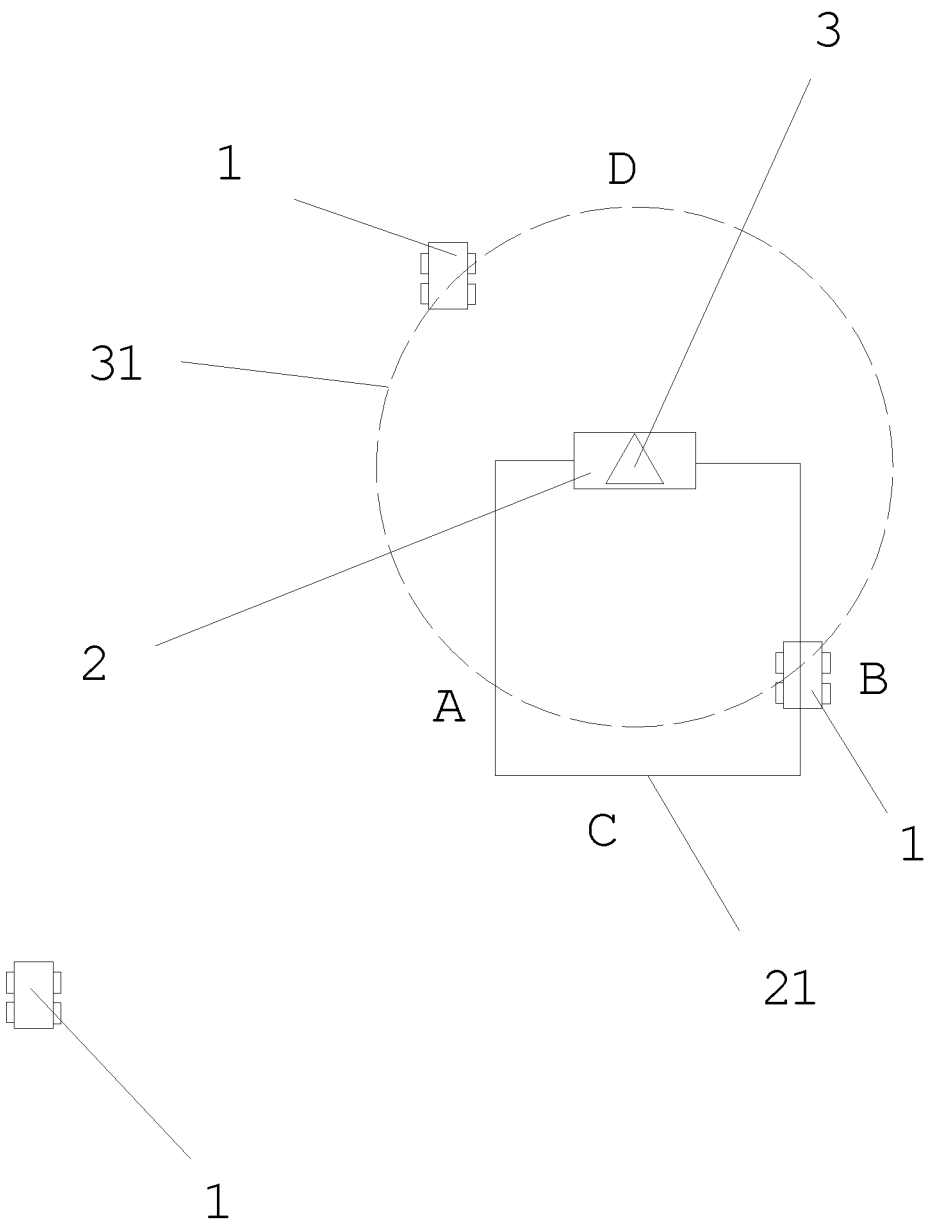
FIG. 2 is the regression schematic diagram of the method for docking the self-moving device with the charging station in the first usage scenario according to the present disclosure.
Figure 3:
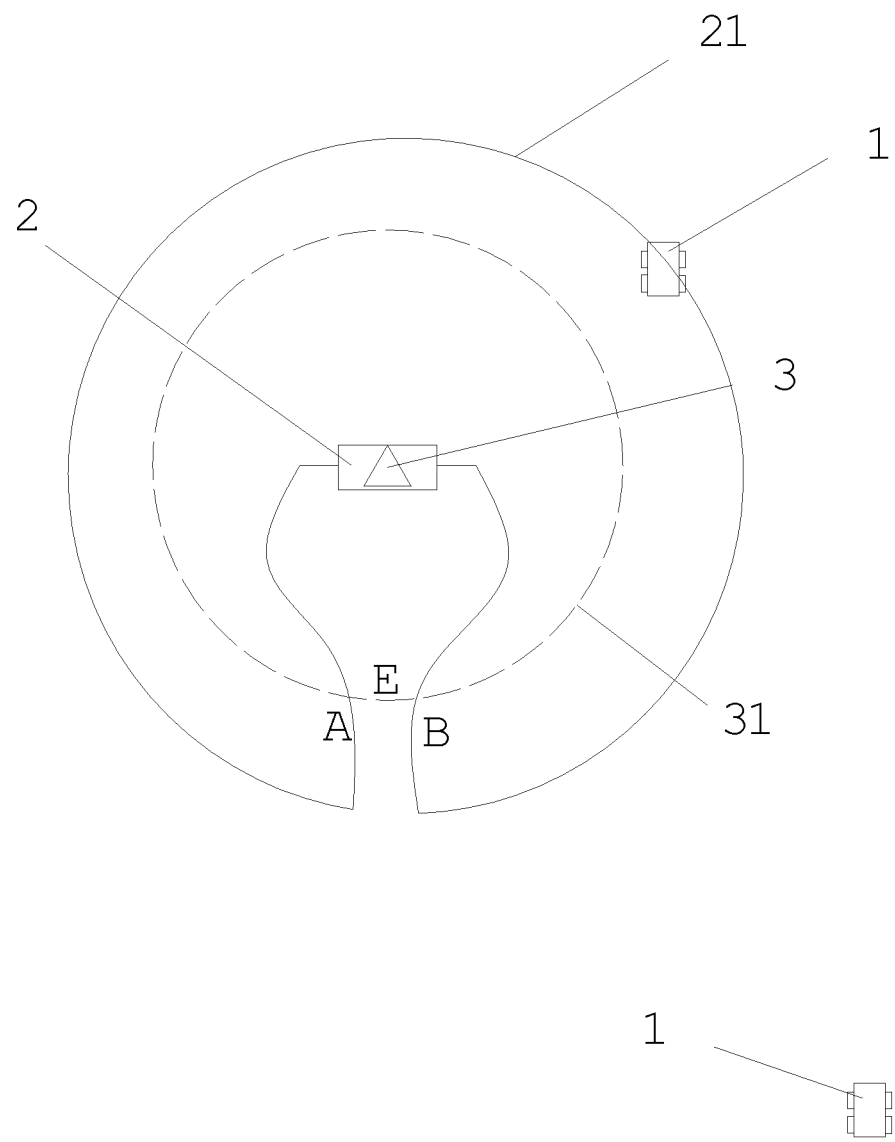
FIG. 3 is the regression schematic diagram of the method for docking the self-moving device with the charging station in the second usage scenario according to the present disclosure.

Referring to FIGS. 1-3, the present disclosure provides a method for docking a self-moving device with a charging station, the charging station 2 is connected to the boundary line 21, and the method comprises the following steps:

step S1: controlling the self-moving device 1 to move from the current position close to the docking boundary 31, and judging whether the self-moving device 1 senses a boundary line signal; if the self-moving device 1 senses the boundary line signal before it reaches the docking boundary 31 or when it reaches the docking boundary 31, execute step S2; if the self-moving device 1 has not sensed the boundary line signal when it reaches the docking boundary 31, then execute step S3;

step S2: controlling the self-moving device 1 to move to the charging station 2 through the boundary signal until the docking is successful;

step S3: controlling the self-moving device 1 to move from the docking boundary 31 to the boundary line 21 until the boundary line signal is sensed.

Wherein, the step S1 is the rough positioning regression, the step S2 is the precise positioning regression, and the step S3 is the connection process of the rough positioning regression and the precise positioning regression.

In another embodiment of the present disclosure, the specific process of step S1: controlling the self-moving device 1 to move from the current position close to the docking boundary 31 through the radio detection device, so as to perform the rough positioning regression of the self-moving device 1. The radio detection device comprises a positioning base station 3 and a positioning tag, the positioning base station 3 is set within a predetermined distance of the charging station 2, and the positioning tag is set on the self-moving device 1, according to the distance between the positioning tag and the positioning base station 3, controlling the self-moving device 1 to move from the current position close to the docking boundary 31.

In another embodiment of the present disclosure, the positioning base station 3 may be a UWB positioning base station or a Zigbee positioning base station, the number of the positioning base station 3 may be one, and the positioning base station 3 is arranged around the charging station 2. For example, the positioning base station 3 is set at the charging station 2, or the positioning base station 3 is set outside the charging station 2 at intervals. When the positioning base station 3 is set at the charging station 2, the distance between the positioning tag and the positioning base station 3 refers to the distance between the self-moving device 1 and the charging station 2. When the positioning base station 3 is set outside the charging station 2 at intervals, the distance between the positioning tag and the positioning base station 3 refers to the approximate distance between the self-moving device 1 and the charging station 2.

In another embodiment of the present disclosure, the positioning base station 3 may be a UWB positioning base station or a Zigbee positioning base station, the number of the positioning base stations 3 may be multiple, and the multiple positioning base stations 3 are laid out around the charging station2, one of the positioning base stations 3 is set at the charging station 2, and the coordinates of the current position of the self-moving device 1 and the coordinate of the charging station 2 are obtained through a plurality of positioning base stations 3, the self-moving device 1 can be controlled to move from the current position to the docking boundary 31 according to the coordinates of the current position of the self-moving device 1 and the coordinate of the charging station 2.

In another embodiment of the present disclosure, the specific process of step S1: control the self-moving device 1 to move from the current position close to the docking boundary 31 through a vision system, and the vision system comprises a camera set on the self-moving device 1 and the docking mark set at the charging station 2, the step of controlling the self-moving device 1 to close the docking boundary 31 from the current position further comprises:
  collecting an image of the environment via the camera;
  judging the positional relationship between the self-moving device 1 and the charging station 2 according to the environment image;
  according to the positional relationship between the self-moving device 1 and the charging station 2, controlling the self-moving device 1 to move from the current position to the docking boundary 31.

For example, the charging station 2 is provided with a docking mark, and the docking mark may be a special mark such as a plane/stereo/light source. The collected environment image has a docking mark, the distance between the self-moving device 1 and the charging station 2 is analyzed according to the docking mark in the environmental image, and the self-moving device 1 is controlled to move from the current position to the docking boundary 31 according to the distance.

In another embodiment of the present disclosure, the boundary line 21 is a ring-shaped signal line connecting the charging station, and the shape enclosed by the boundary line can be set as required, for example, the rectangular boundary line 21 shown in FIG. 2, the arc-shaped boundary line 21 shown in FIG. 3. The docking structure of the self-moving device 1 and the charging station 2 can be set as required. For example, one end of the self-moving device 1 or the charging station 2 is provided with a charging insert or a charging pin, and the other end of the self-moving device 1 or the charging station 2 is provided with a charging socket. When the charging insert or the charging pin is electrically connected with the charging socket, the docking is successful. In addition, it can also be charged by wireless charging. Through the guidance of the boundary line 21, the precise positioning regression to the charging station 2 is completed, and charging is performed.

In another embodiment of the present disclosure, the step S3 may be to control the self-moving device 1 to move around the docking boundary 31 along the docking boundary 31 until a boundary line signal is sensed.

Referring to FIG. 2, the charging station 2 is connected to a rectangular boundary line 21, a positioning base station 3 is set at the charging station 2, docking boundary 31 is set to intersect with the rectangular boundary line 21, and the intersection point comprises the intersection point A and the intersection point B, the part of the rectangular boundary line 21 beyond the docking boundary 31 is C, and the part of the docking boundary 31 beyond the rectangular boundary line 21 is D. After the rough positioning regression, the self-moving device 1 reaches the ADB of the docking boundary 31 or the ACB of the boundary line 21. If the self-moving device 1 reaches the ADB of the docking boundary 31 and it is far from the intersection point A or the intersection point B, the self-moving device 1 has not sensed the boundary line signal, then after the self-moving device 1 reaches the ADB of the docking boundary 31, it moves in a circle on the ADB, for example, it moves clockwise to the intersection point B, and then the self-moving device 1 moves around the rectangular boundary line 21 from the intersection point B until the docking with the charging station 2 is successful.

In another embodiment of the present disclosure, the step S3 may be to control the self-moving device 1 to rotate at a predetermined angle on the docking boundary 31 and continue walking until a boundary line signal is sensed.

Referring to FIG. 3, the charging station 2 is connected to the arc-shaped boundary line 21, the positioning base station 3 is set at the charging station 2, and the docking boundary 31 is set to intersect with the arc-shaped boundary line 21. The intersection point comprises intersection point A and intersection point B. The part of the docking boundary 31 beyond the arc-shaped boundary line 21 is E, the part of the arc-shaped boundary line 21 beyond the docking boundary 31 is the outer boundary line, and the part of the arc-shaped boundary line 21 inside the docking boundary 31 is the inner boundary line, a narrow channel is formed between the outer boundary line and the inner boundary line. After the rough positioning regression, the self-moving device 1 reaches the outer boundary line and senses the boundary line signal. The self-moving device 1 moves around the arc-shaped boundary line 21 until it is successfully docked with the charging station 2. The self-moving device 1 reaches the AEB of the docking boundary 31. If the self-moving device 1 has not sensed the boundary line signal at this time, the self-moving device 1 is controlled to rotate at the AEB of the docking boundary 31 by a predetermined angle and continue walking until the boundary line signal is sensed.

In another embodiment of the present disclosure, the positioning base station is separated from the charging station, the docking boundary is a docking circle with the positioning base station as the center, the radius of the docking circle is $D_{dst}$, and the connecting boundary line of the charging station is wound around the periphery of the docking boundary. During the rough positioning regression process through the docking boundary, the self-moving device continuously closes the positioning base station until it reaches the boundary line.

Figure 4:
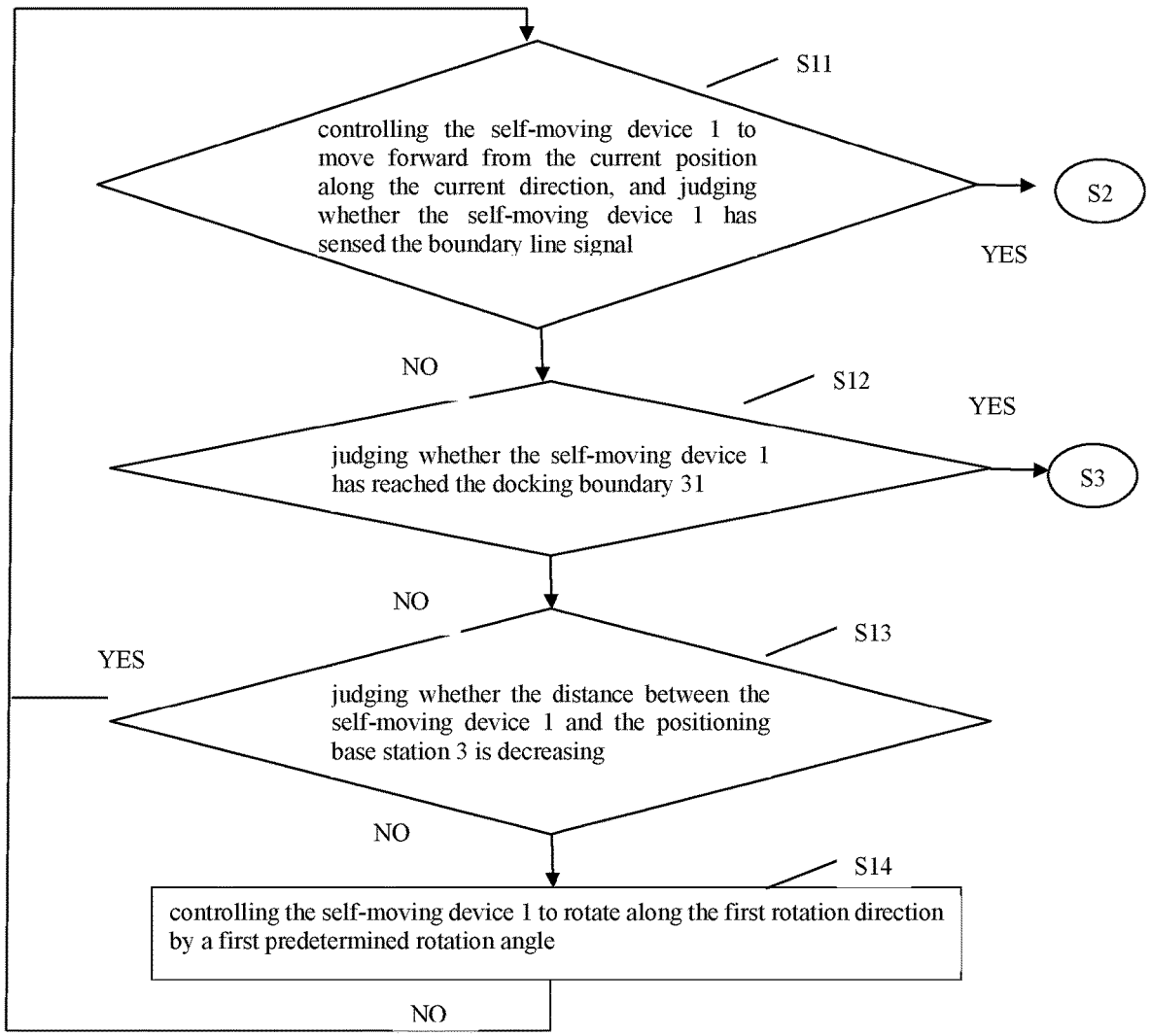
FIG. 4 is the specific flow chart of the first embodiment of step S1 in FIG. 1.

Referring to FIG. 4, in another embodiment of the present disclosure, the step S1 further comprises the following steps:
step S11: controlling the self-moving device 1 to move forward from the current position along the current direction, and judging whether the self-moving device 1 has sensed the boundary line signal; if the self-moving device 1 has not sensed the boundary line signal, then execute step S12; if the self-moving device 1 has sensed a boundary line signal, execute step S2;
step S12: judging whether the self-moving device 1 has reached the docking boundary 31; if the self-moving device 1 has not reached the docking boundary 31, then execute step S13; if the self-moving device 1 has reached the docking boundary 31, then executing step S3;
step S13: judging whether the distance between the self-moving device 1 and the positioning base station 3 is decreasing; if the distance between the self-moving device 1 and the positioning base station 3 is decreasing, return to execute step S11; if the distance between the self-moving device 1 and the positioning base station 3 is not decreasing, executing step S14;
step S14: controlling the self-moving device 1 to rotate along the first rotation direction by a first predetermined rotation angle, and then returning to execute step S11.

Figure 5:
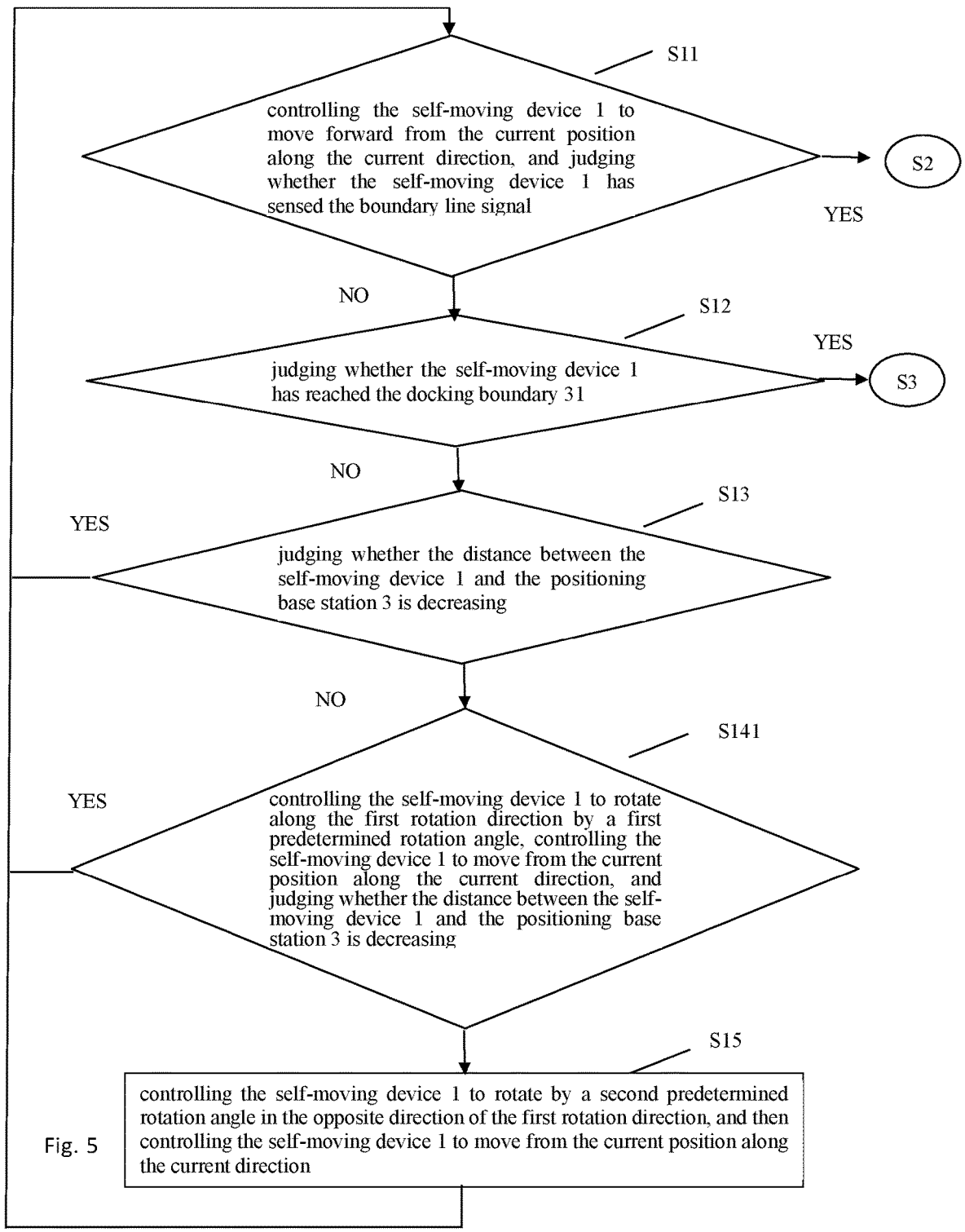
FIG. 5 is the specific flow chart of the second embodiment of step S1 in FIG. 1.

Referring to FIG. 5, in another embodiment of the present disclosure, the step S1 further comprises the following steps:
step S11: controlling the self-moving device 1 to move forward from the current position along the current direction, and judging whether the self-moving device 1 has sensed the boundary line signal; if the self-moving device 1 has not sensed the boundary line signal, then executing step S12; if the self-moving device 1 has sensed a boundary line signal, executing step S2;
step S12: judging whether the self-moving device 1 has reached the docking boundary 31; if the self-moving device 1 has not reached the docking boundary 31, then executing step S13; if the self-moving device 1 has reached the docking boundary 31, then executing step S3;
step S13: judging whether the distance between the self-moving device 1 and the positioning base station 3 is decreasing; if the distance between the self-moving device 1 and the positioning base station 3 is decreasing, returning to execute step S11; if the distance between the self-moving device 1 and the positioning base station 3 is not decreasing, executing step S14;
step S141: controlling the self-moving device 1 to rotate along the first rotation direction by a first predetermined rotation angle, controlling the self-moving device 1 to move from the current position along the current direction, and judging whether the distance between the self-moving device 1 and the positioning base station 3 is decreasing; if the distance between the self-moving device 1 and the positioning base station 3 is decreasing, then returning to execute step S11; if the distance between the self-moving device 1 and the positioning base station 3 is not decreasing, executing step S15;
step S15: controlling the self-moving device 1 to rotate by a second predetermined rotation angle in the opposite direction of the first rotation direction, and then controlling the self-moving device 1 to move from the current position along the current direction; and then returning to execute step S11.

Figure 6:
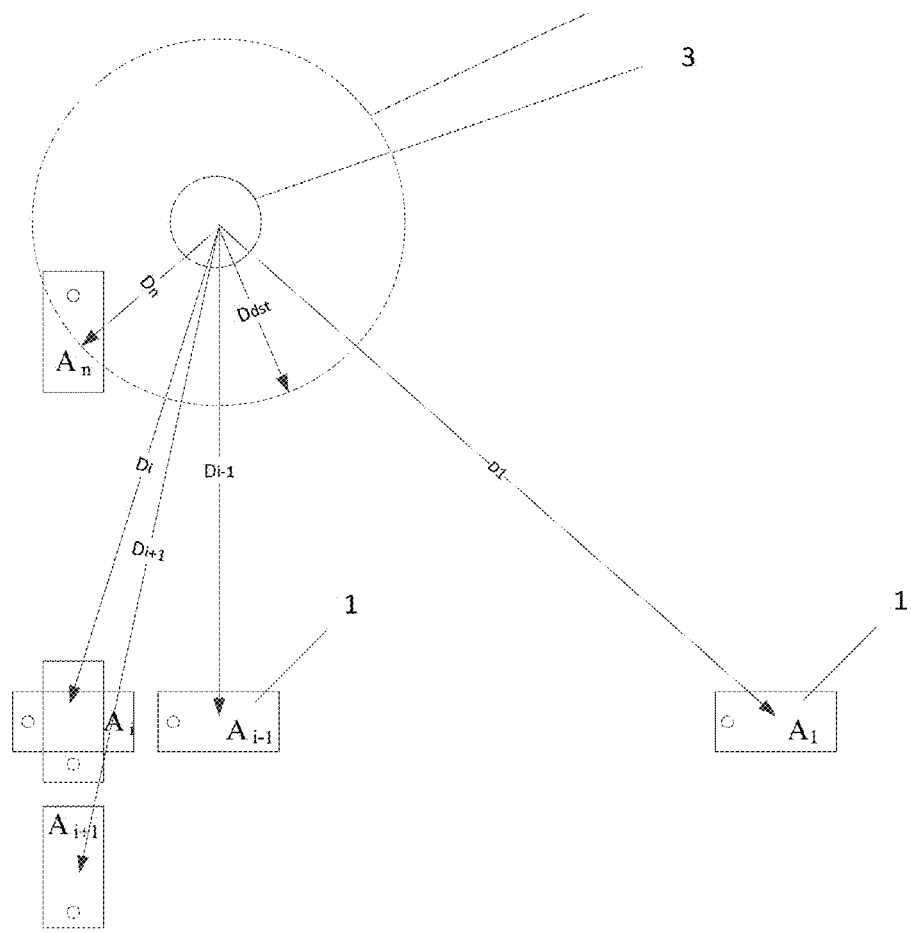
FIG. 6 is the rough positioning regression state diagram of the method for docking the self-moving device with the charging station of the present disclosure.

Referring to FIG. 6, in another embodiment of the present disclosure, the docking boundary 31 is a docking circle with the positioning base station 3 as the center, the radius of the docking circle is $D_{dst}$, and the distance between at least part of the boundary line 21 and the positioning base station 3 is not less than $D_{dst}$.

Control the self-moving device 1 to move close to the docking boundary 31, and the distances between the self-moving device 1 at the position of point $A_1$, point $A_{i-1}$, point $A_i$, point $A_{i+1}$, point $A_n$ and the positioning base station 3 are respectively $D_1$, $D_{i-1}$, $D_i$, $D_{i+1}$, $D_n$, the self-moving device 1 reaches the point $A_n$ ($D_n=D_{dst}$) on the docking boundary 31 after passing through the point ($D_{i-1}>D_{dst}$), the point $A_i$ ($D_i>D_{dst}$), and the point $A_{i+1}$ ($D_{i+1}>D_{dst}$) from the current position $A_1$($D_1>D_{dst}$) in sequence.

The self-moving device 1 rotates the first predetermined rotation angle θ in a random direction (e.g., rotate 90 degrees to the left) at the position of point $A_i$, and then moves forward after the rotation; if the distance between the self-moving device 1 and the positioning base station 3 is not decreasing, stop moving forward (as shown in the position of point $A_{i+1}$ in FIG. 6), rotate the self-moving device 1 the second predetermined rotation angle 2*θ in the opposite direction (e.g., rotate 180 degrees to the right), and then move forward to the position of point $A_n$ after rotation.

Figure 7:
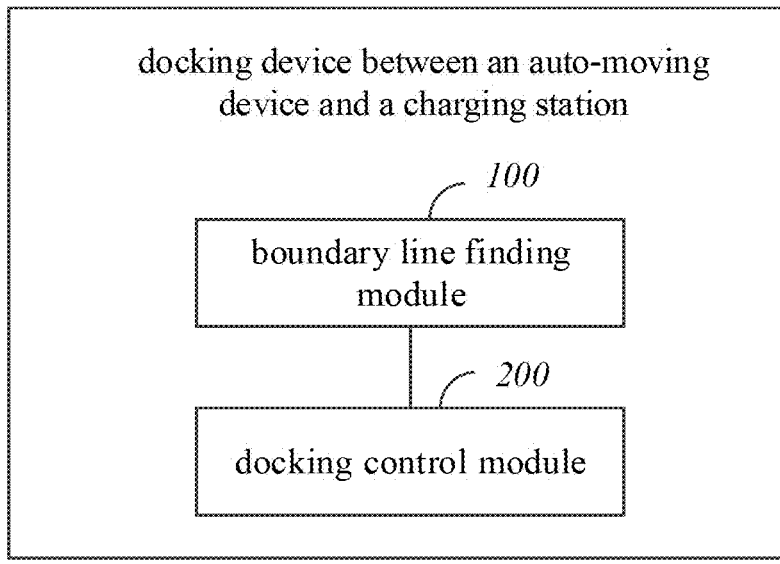
FIG. 7 is a schematic block diagram of a device for docking a self-moving device with a charging station according to the present disclosure.

Referring to FIG. 7, the present disclosure also provides a docking device 101 between a self-moving device and a charging station, the device comprises:
a boundary line finding module 100, used to control the self-moving device to move from the current position close to the docking boundary; and to judge whether the self-moving device has sensed the boundary line signal;
a docking control module 200, used to control the self-moving device to move from the docking boundary to the boundary line until the boundary line signal is sensed; and to control the self-moving device to move to the charging station through the boundary line signal until the docking is successful.

The present disclosure also provides a self-moving device, comprising a memory and a processor, the memory storing a computer program, and when the computer program is executed by the processor, the steps of a method for docking the self-moving device with a charging station are implemented.

The present disclosure also provides a readable storage medium storing a computer program thereon, and when the computer program is executed by a processor, the steps of the method for docking a self-moving device with a charging station are implemented.

In summary, the present disclosure sets the docking boundary and controls the self-moving device to move close to the docking boundary to find the boundary line, which can reduce the time for the self-moving device to find the boundary line, thereby improving the regression efficiency of the self-moving device.

In addition, it should be understood that although this specification is described in terms of embodiments, not each embodiment only comprises an independent technical solution, and this description in the specification is only for the sake of clarity, and those skilled in the art should take the specification as a whole, the technical solutions in each embodiment can also be appropriately combined to form other embodiments that can be understood by those skilled in the art.

The series of detailed descriptions listed above are only specific descriptions for the feasible embodiments of the present disclosure and are not intended to limit the protection scope of the present disclosure. Any equivalent embodiments or changes made without departing from the technical spirit of the present disclosure should be comprised within the protection scope of the present disclosure.

The invention claimed is:

1. A method for docking a self-moving device to a charging station, the charging station being connected to a boundary line, the method comprising the following steps:
controlling the self-moving device to move from a current position relative to a docking boundary using a radio detection device, the radio detection device including a positioning base station and a positioning tag, the positioning base station set within a predetermined distance of the charging station, and the positioning tag set on the self-moving device, and, according to the distance between the positioning tag and the positioning base station, controlling the self-moving device to move from the current position relative to the docking boundary, the docking boundary being a docking circle with the positioning base station at a center of the docking circle, a radius of the docking circle being $D_{dst}$, and the distance between at least part of the boundary line and the positioning base station being not less than $D_{dst}$, the docking boundary and the boundary line configured so that they intersect one another;
judging whether the self-moving device senses a boundary line signal from the boundary line during the step of controlling the self-moving device to move;
if the self-moving device senses the boundary line signal before or when reaching the docking boundary, controlling the self-moving device to move to the charging station based on the boundary line signal until the self-moving device successfully docks with the charging station; and
if the self-moving device does not sense the boundary line signal when reaching the docking boundary, controlling the self-moving device to move from the docking boundary to the boundary line by moving around and along the docking boundary until the self-moving device senses the boundary line signal.

2. The method for docking a self-moving device to a charging station according to claim 1, wherein the step of controlling the self-moving device to move from the docking boundary to the boundary line by moving around and along the docking boundary until the self-moving device senses the boundary line signal further includes:
controlling the self-moving device to rotate at a predetermined angle on the docking boundary and continue to walk until the self-moving device senses the boundary line signal.

3. The method for docking a self-moving device to a charging station according to claim 1, wherein the step of controlling the self-moving device to move from the current position relative to the docking boundary further includes:
controlling the self-moving device to move forward from the current position along a current direction, and judging whether the self-moving device senses the boundary line signal, and when the self-moving device does not sense the boundary line signal, judging whether the self-moving device reaches the docking boundary;
wherein, if the self-moving device does not reach the docking boundary, judging whether the distance between the self-moving device and the positioning base station is decreasing,
wherein, if the distance between the self-moving device and the positioning base station is decreasing, controlling the self-moving device to move from the current position along the current direction, and judging whether the self-moving device senses the boundary line signal, and
wherein, if the distance between the self-moving device and the positioning base station is not decreasing, controlling the self-moving device to rotate along a first rotating direction by a first predetermined rotation angle, and then controlling the self-moving device to move forward from the current position along the current direction, and judging whether the self-moving device senses the boundary line signal; and
if the self-moving device has reached the docking boundary, controlling the self-moving device to move from the docking boundary to the boundary line until the boundary line signal is sensed.

4. The method for docking a self-moving device to a charging station according to claim 1, wherein the step of controlling the self-moving device to move from the current position relative to the docking boundary uses a vision system, the vision system including a camera on the self-moving device and a docking mark on the charging station.

5. A self-moving device, comprising a memory and a processor, the memory storing a computer program, and when the computer program is executed by a processor, the steps of a method for docking the self-moving device to a charging station according to claim 1 are implemented.

* * * * *